Sept. 1, 1959 R. ADELL 2,902,314
EDGE MOLDING FOR VEHICLE CLOSURES

Original Filed Dec. 26, 1952 2 Sheets-Sheet 1

INVENTOR.
ROBERT ADELL
BY
ATTORNEY.

Sept. 1, 1959 R. ADELL 2,902,314
EDGE MOLDING FOR VEHICLE CLOSURES
Original Filed Dec. 26, 1952 2 Sheets-Sheet 2

INVENTOR.
ROBERT ADELL
BY
ATTORNEY.

United States Patent Office 2,902,314
Patented Sept. 1, 1959

2,902,314

EDGE MOLDING FOR VEHICLE CLOSURES

Robert Adell, Detroit, Mich., assignor to Franklin Z. Adell and Marvin M. Adell, Detroit, Mich.

Original application December 26, 1952, Serial No. 328,065, now Patent No. 2,856,228, dated October 14, 1958. Divided and this application May 23, 1958, Serial No. 739,452

2 Claims. (Cl. 296—44)

This invention relates to motor vehicles and more particularly to an improved body therefor. The present application is a division of my co-pending application Serial No. 328,065, filed on December 26, 1952, and now Patent No. 2,856,228, for Automobile Body Construction.

An automobile body, by its nature and construction, must include a number of swinging closures to permit access into and an exit from the interior of the body, as well as access to certain compartments thereof and particularly the rear compartment used for carrying luggage, tools, spare tire, etc., and an engine compartment. These swinging closures include the vehicle doors, usually two or four in number, a rear compartment lid and an engine hood.

Provision of said swinging closures results in a number of very difficult problems in this particular art, for some of which an adequate solution has not yet been found in spite of numerous attempts and a great variety of expedients proposed.

It is commonly appreciated that opening an automobile door in a parking lot or a garage often causes hitting the adjacent car or wall with the edge of the door. This may produce marring the finished surface of the adjacent car and create nicks on the edge of the door, usually removing the paint therefrom and exposing the metal. After a certain period of time, the exposed metal begins to rust, and the nick expands itself by the rust pushing up the paint around the edges of the nick.

One of the objects of the present invention is to provide an improved automobile body in which the above difficulties are overcome and largely eliminated, whereby a greatly superior automobile body is provided with very little, if any, net increase in the cost thereof.

Another object of the present invention is to provide an automobile body in which the gaps along the edges of swinging closures such as doors, rear compartment lid, and engine hood, are closed and a uniform fit of the closure along the edges of the body recess receiving such closures is easily effected.

A further object of the present invention is to provide an improved automobile body in which uneven gaps along the edges of the closure in the closed position thereof, occurring because of various manufacturing imperfections in the parts involved, or faults in workmanship in installing the door or other closures in their respective recesses, may be easily corrected.

A further object of the present invention is to provide an improved automobile body in which nicking and rusting of the edges of the swinging closures, and the resulting unsightly appearance of the body, often requiring refinishing, are eliminated.

A still further object of the present invention is to provide an automobile body, which affords novel means and opportunities for ornamenting the body and imparting to it a very striking and pleasing ornamental appearance.

Further objects and advantages of this invention will be apparent from the following description and appended claims, reference being had to the accompanying drawings forming a part of this specification, wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention I provide means whereby the outer or swinging edges of the closures of an automobile body may be extended within predetermined limits beyond the contour of the closure, thereby closing or equalizing the gap that may be present between the outer edges of the closure in the closed position thereof at the body. In the embodiment illustrated, said means are exemplified by edge molding adapted to be installed on the closure along the edges thereof. Said molding, in addition to the above mentioned function, also serves as protective molding preventing nicking, rusting and other damage to the edges of the closure. In addition, the molding, which may be made of plated and polished sheet metal, is highly ornamental and provides novel means for improving appearance of an automobile body and imparting to it a much more pleasing appearance than a conventional automobile body now has. The molding may be of the edge-embracing type or the edge-covering type.

Figure 1:
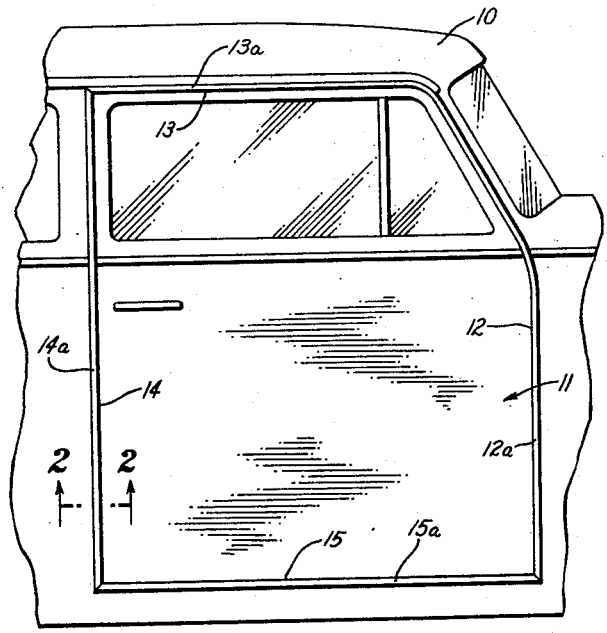
Fig. 1 is a fragmentary side view of an automobile body having a front door and embodying the present invention.
Figure 2:
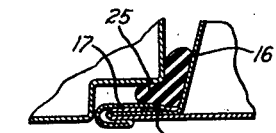
Fig. 2 is a fragmentary sectional view taken in the direction of the arrow on the section plane passing through the line 2—2 of Fig. 1.
Figure 3:
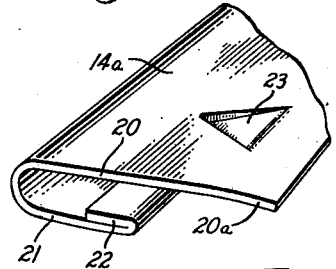
Fig. 3 is a fragmentary perspective view of the edge molding, showing the means for connecting the molding to the edge of the door or other swinging closures.

In the drawings there is shown, by way of example, an automobile body having swinging closures, and particularly doors, a rear compartment lid, and the engine hood, and embodying the present invention. Referring specifically to Figs. 1–3, a body 10 illustrated therein is provided with a door 11 of a generally rectangular shape and having a front edge 12, upper edge 13, a rear or swinging edge 14, and a lower edge 15. The door may be constructed to have any suitable thickness and to have an edge formed by the joint of the edge of the inner sheet or panel 16 and the edge 17 bent upon itself as is shown in Fig. 2, thus providing an edge extending outwardly in the plane of the door and having thickness of three sheets of the sheet metal used in the construction of the door.

Around the entire length of the peripheral edges of the door there is provided thereon the edge molding designated by 12a, 13a, 14a and 15a. This molding is of the edge-embracing type and comprising a strip of sheet metal, preferably plated and polished on the outside, and bent longitudinally upon itself to have a U-shaped cross section having a longer leg 20 and a shorter leg 21, with the edge of said shorter leg 21 being also bent upon itself, as shown at 22.

Means are provided to secure or connect the molding to the edge of the door. In the embodiment illustrated in Figs. 1–3, said means are exemplified by teeth, such as the tooth 23 in Fig. 3, pressed out from the material of the molding along the length of its longer leg 20 and having a sharp point depressed inwardly of the molding and pointing toward the connecting portion thereof, thus making the teeth 23 extend at an acute angle to the plane of the leg 20, as shown.

The metal of the molding preferably possesses sufficient resiliency and is shaped to require being somewhat opened by installation on the edge. Thus, when the molding is installed on the edge, it grips the edge and the sharp point of the prong or tooth 23 tends to dig in into the edge of the door in any tendency to slip off from said edge, thus providing a safe and secure connection of the molding to the door edge. It should be understood, however, that other connecting means such as screws, bolts, rivets, welding or soldering may also be employed, if desired.

Installation of the edge molding may be done in manufacturing of the body or it may be done on the door of an automobile which is already on the road and perhaps had been on the road for a number of years. In other words, my improved means described above may be incorporated into a body as a part thereof or be distributed to the trade as an accessory for a spare part for installation in the field.

If desired, any suitable sealing means such as a rubber strip 25 may be carried by the door and connected thereto in any suitable manner. If already provided on the door, such means need not be disturbed, and the longer leg 20 of the molding, which may be slightly pressed inwardly as shown at 20a, may be slipped under said strip 25.

Figure 4:
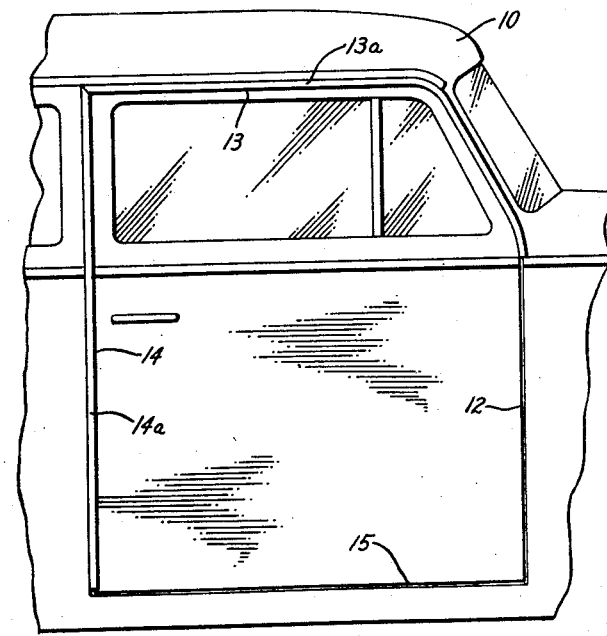
Fig. 4 is a view similar in part to Fig. 1 but showing the door of a modified construction.

In the embodiment illustrated in Fig. 1, the edge molding is provided around the entire length of all of the door edges. In some cases it may be desirable to dispense with the provision of the edge molding along the lower edge 15 of the door, as well as along the lower portion of the edge 12 and provide the edge molding only along the upper portion of the edge 12, the upper edge 13, and the rear or swinging edge 14, as illustrated in Fig. 4. In other respects, the arrangement of the molding and the construction of the edge molding itself may be similar or identical to those shown in Figs. 1–3.

Figure 5:
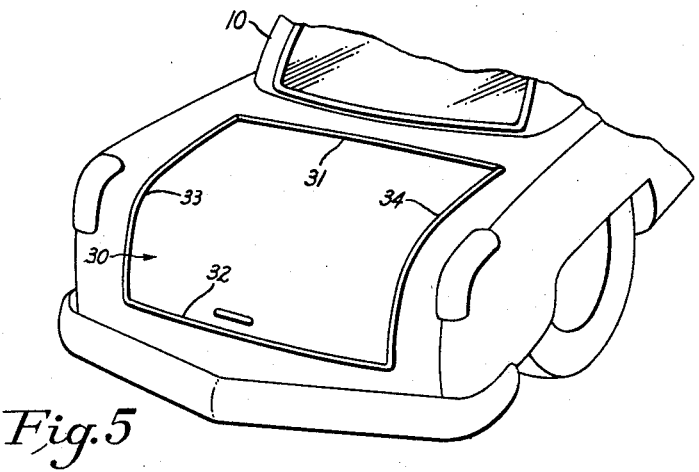
Fig. 5 is a fragmentary perspective view of an automobile body having a swinging lid for the rear compartment and embodying the present invention.

Fig. 5 illustrates a rear portion of the body with the rear compartment lid or cover and embodying the present invention. As shown in said figure, the body 10 includes a rear compartment lid or cover 30 of a generally rectangular shape but curved to comply with the contour of the body and having a front edge 31, a rear edge 32 and side edges 33 and 34. In accordance with the invention, edge molding is provided along the entire length of the edges of said lid 30 around all four sides thereof. The molding may be of the same construction as that shown in Fig. 3 and carry a resilient sealing strip, thereby insuring a complete watertightness of the juncture of the edges of the lid in its closed position at the body. It can be appreciated that under certain conditions the provision of the edge molding along the front edge 31 may be dispensed with.

It will be understood that while plated sheet metal edge molding is preferred, such molding may also have the same color as the closure itself and be made of sheet materials other than metal such, for instance, as plastic. It will also be understood that the edge molding may be omitted along certain portions of the closure edge.

There is thus provided an improved automobile body and a protective and ornamental edge molding for the swinging closures thereof, whereby the objects of the present invention listed above and numerous additional objects are attained.

I claim:

1. In an automobile body, a swinging closure having peripheral edges, said edges including curvilinear portions and adapted to come in the closed position of the closure into a substantially flush relationship with the adjacent edges of the body, an ornamental and edge protective molding secured at least along a portion of some of the trailing edges of said closure to cover said edges of the closure and to extend only to the adjacent edges on the body opposite said closure edges but without overlapping the same, said molding being made as a separate piece from a strip of sheet metal having bare metal finish and bent upon itself to a substantially U-shaped cross section, a plurality of sharp pointed retaining teeth provided on the inner leg of said strip and pointing toward the closed end of the U, said teeth being adapted to engage the inner side of the peripheral edge of the closure at an acute angle thereto to resist, by digging into the material thereof, slipping off of the molding from said edges of the closure.

2. In an automobile body having a rear compartment, a swinging lid for said compartment of a generally rectangular shape hinged to said body by one of its sides, the edges of said lid being adapted to come in the closed position of the lid into a substantially flush relationship with the adjacent edges of the body, an ornamental and edge protective molding secured to the edges of said lid at least around the three unhinged sides thereof to cover the edges of the lid and to extend in a closed position of the lid substantially to the adjacent edges of the body opposite the closure but without overlapping the same, said molding being made as a separate piece from a strip of resilient sheet metal bent upon itself to a substantially U-shaped cross section, and a plurality of sharp retaining teeth provided on the inner leg of said molding and pointing toward the closed end of the U, said teeth being adapted to extend at an acute angle thereto and to engage positively the structure of the lid on the inner side of the peripheral edge thereof to retain itself in place.

References Cited in the file of this patent

UNITED STATES PATENTS

| | | |
|---|---|---|
| 2,226,615 | Killen | Dec. 31, 1940 |
| 2,356,976 | Conlon | Aug. 29, 1944 |
| 2,383,575 | Wernig | Aug. 28, 1945 |

FOREIGN PATENTS

| | | |
|---|---|---|
| 811,432 | Germany | Aug. 20, 1951 |